March 17, 1959

T. J. MAXEY 2,878,448

FREQUENCY CALIBRATION SYSTEM

Filed June 1, 1956

INVENTOR.
THOMAS J. MAXEY,
BY
ATTORNEY.

March 17, 1959     T. J. MAXEY     2,878,448
FREQUENCY CALIBRATION SYSTEM
Filed June 1, 1956     2 Sheets-Sheet 2
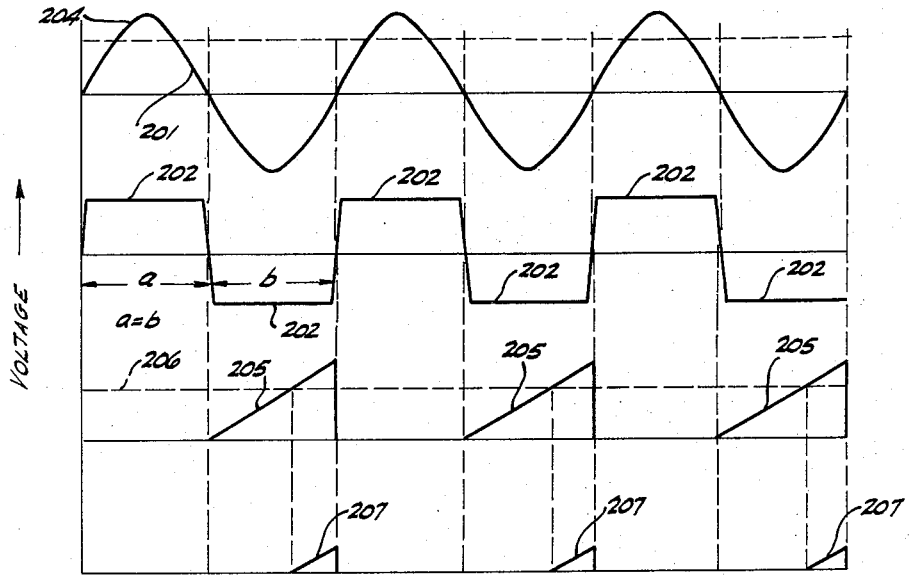
Fig. 2.
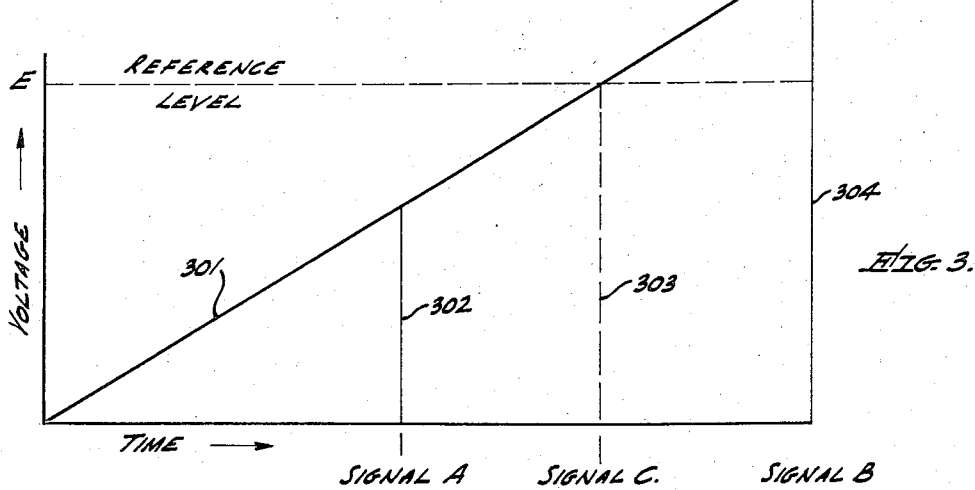
Fig. 3.
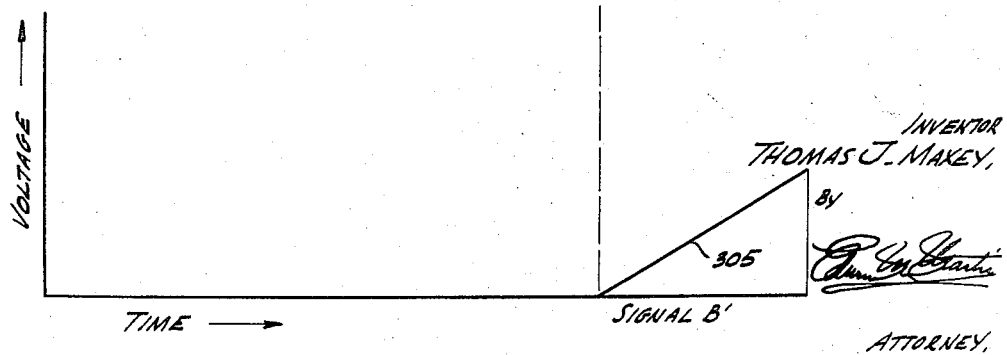
INVENTOR
THOMAS J. MAXEY,
ATTORNEY.

United States Patent Office 2,878,448
Patented Mar. 17, 1959

2,878,448

FREQUENCY CALIBRATION SYSTEM

Thomas J. Maxey, Culver City, Calif., assignor to Hughes Aircraft Company, Culver City, Calif., a corporation of Delaware Application June 1, 1956, Serial No. 588,919

5 Claims. (Cl. 324—79)

This invention relates to frequency calibration systems and more particularly to a circuit for measuring the frequency of low frequency electric signals to a high degree of accuracy as an indicator of frequency deviation of a test signal from a standard frequency wave.

The measurement of a particular frequency in electronic apparatus usually is accomplished by measuring the difference of the frequency between the signal to be measured and a known standard frequency wave having a frequency which is close in value to the frequency to be measured. When the frequency difference is in the subaudible range accurate measurement has not heretofore been easily accomplished, except by attempting to "count beats" obtained by beating together the test signal and standard wave. But, where it is necessary to provide a quick measurement for these low frequency signals which is simple and may be operated automatically, none is available.

Accordingly, it is an object of this invention to provide a calibrating system for signals whose difference in frequency is low.

It is a further object of this invention to provide a calibrator for low frequency signals.

It is yet another object of this invention to provide a means for indicating when a difference in frequency between two close frequencies reaches a predetermined value.

And it is still another object of this invention to provide a frequency calibrator comprising a mixer, a standard frequency source, the mixer having an input circuit for a source of test frequency and an input circuit connected to the standard frequency source, a ramp signal generator, and a means for utilizing the output of the ramp signal generator to produce an indication at a predetermined level of the ramp signal.

These and other objects of this invention will be more fully understood from the following specification and claims when taken together with the drawings in which:

Fig. 2 is a graph of a series of waveforms representing various phases of the operation of the system as shown in Fig. 1;

Fig. 3 is an expansion of some of the waveforms shown in Fig. 2; and

This invention contemplates a frequency calibrating system which is both simple in structure and easy to operate and use. An embodiment of the frequency calibrator of this invention may include a standard reference wave at some predetermined frequency. Assuming, for example, that it is necessary to provide a low frequency signal of eight cycles per second and maintain this low frequency value, the signal source under test has a frequency of approximately eight cycles per second different from that of the standard reference wave. The signal source under test may be manually adjusted in frequency or automatically frequency controlled by the system of this invention. A mixer is provided to which the two frequency sources are connected and in which a resultant beat frequency signal of approximately eight cycles per second is generated. A squaring circuit is connected to the mixer and provides in its output a square wave signal representative of the beat frequency signal. Visual means is provided to indicate the beat frequency so that when the difference frequency is lower than a predetermined low value which may be approximately one-half cycle per second, the beats may be counted. A ramp generator is connected to the squaring circuit. A sawtooth charging wave is developed by the ramp generator. A coincidence circuit is connected to the ramp generator. The coincidence circuit may be set to discharge and thereby to develop a pulse whenever the exemplary value of eight cycles per second has been reached. This value is indicated by a device which is coupled to an amplifier coupled in turn to the coincidence circuit. If the indicator device is a neon indicator it may be made to glow continuously when the frequency difference is between exactly eight cycles and about one-half cycle. The indicator is extinguished for values above eight cycles per second.

Thus, the operator of a device according to this invention need only watch the neon indicator and make necessary adjustments of the equipment being measured.

Figure 1:
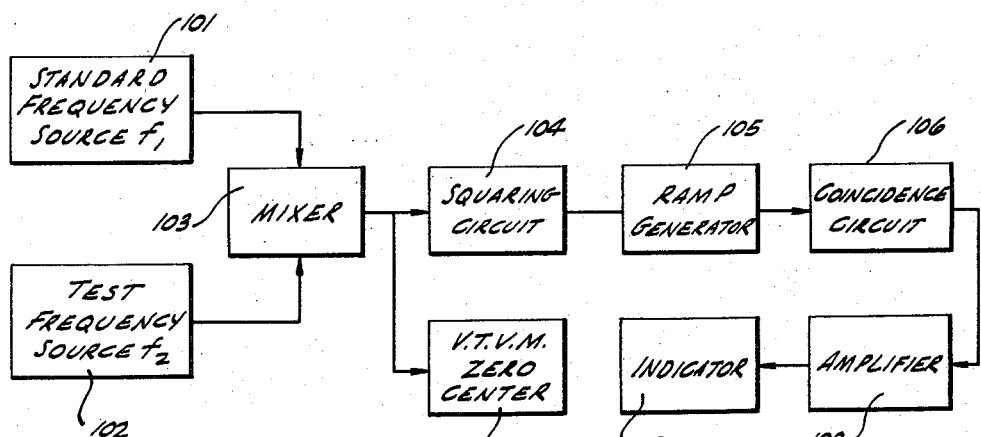
Fig. 1 is a block diagram of the frequency calibrator of this invention.

Referring now to the block diagram of Fig. 1, a standard frequency wave source 101 is shown, along with a test frequency signal source 102. Both sources 101 and 102 are connected to a mixer 103 of the phase detector type. The standard frequency wave source 101 may be any recognized source of this nature such as a quartz crystal controlled oscillator, a primary standard or a secondary standard of which there are many known types. The source of test frequency signals 102 may be any operating device which generates electrical signals at a frequency to be measured or calibrated in accordance with this invention. Mixer circuits of the phase detector type which may be utilized are many and may employ diode circuits, vacuum tube circuits, or semiconductor circuits. Examples of mixer circuits that may be used may be found in any standard text on radio or electronic circuits. The output waveform of mixer 103 is a low frequency sine wave as shown at 201 in Fig. 2. Coupled to the output of phase detector mixer 103 is a zero center type of vacuum tube voltmeter or other type of phase difference indicator 107.

The output of mixer 103 is coupled to a pulse squaring circuit 104 by which the difference frequency signals 201 developed in mixer 103 are "clipped" top and bottom to provide rectangular waves such as 202. The wave or signal 201 is applied to the input of squaring circuit 104. The action of squaring circuit 104 results in waveforms such as shown at 202 wherein the width of the positive portion of pulse 202 as shown at "a" is the same as the width of the negative portion as shown at "b."

The square wave signals 202 are present in the output circuit of squaring circuit 104. The output circuit of squaring circuit 104 is coupled to a ramp generator 105. An example of a squaring circuit such as 104 which may be used in generating the rectangular pulse waveform 202 may be found in "Waveforms" by Chance, et al., p. 166, Figs. 5–7, published by McGraw-Hill in 1949 as vol. 19 of the M. I. T. Radiation Laboratory Series.

Figure 4:
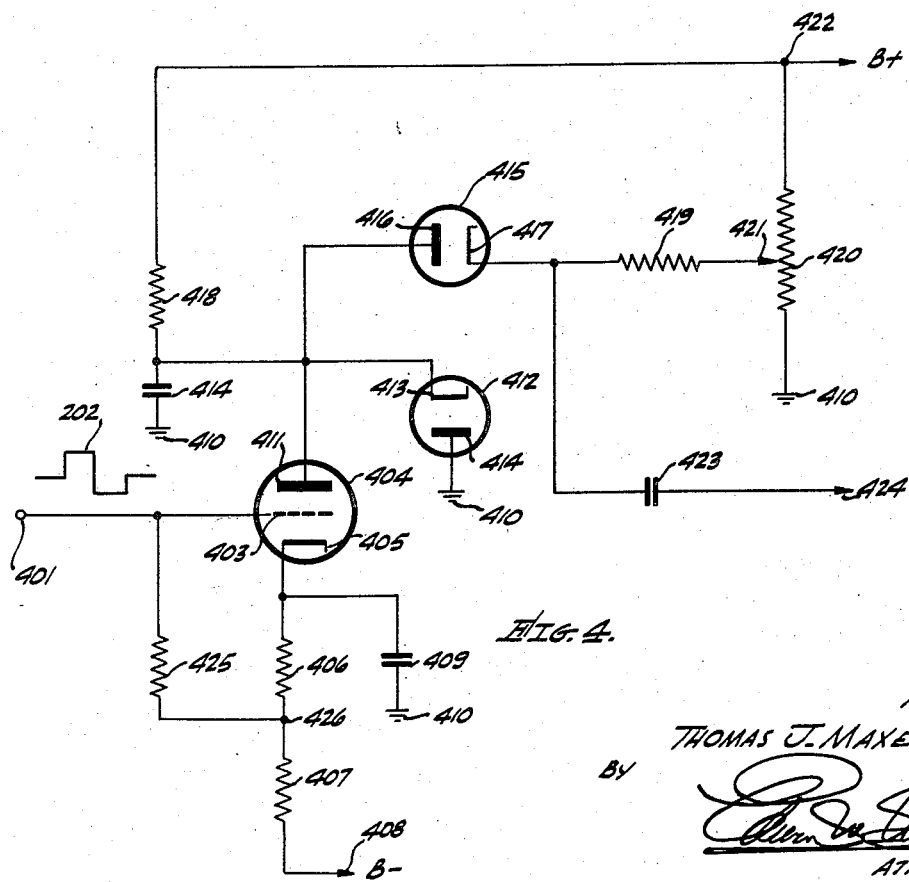
Fig. 4 is a circuit diagram of a coincidence circuit included in the system of Fig. 1.

The ramp generator 105 is more fully illustrated in Fig. 4 to which reference is now made. By ramp signal is meant a signal which increases substantially linearly with time. An input terminal 401 is provided which is connected to the grid 403 of ramp generator tube 404. This is the terminal to which the output of squaring circuit 104 is connected. The cathode 405 of tube 404 is connected through two serially connected cathode bias resistors 406 and 407 to a source 408 of B— potential referenced to ground. A by-pass capacitor 409 is connected between cathode 405 and ground 410. The cathode 413 of a diode 412 which may be a vacuum diode, as shown, or a semi-conductor diode (not shown) is connected to the anode 411 of tube 404. A charging capacitor 414 is connected between the anode 411 of tube 404 and ground 410. A grid leak resistor 425 is connected between grid 403 of tube 404 and the junction 426 of resistors 407 and 408.

An anode load or charging resistor 418 is connected between anode 411 of tube 404 and a source 422 of B+ potential referenced to ground. The anode 416 of a diode 415 is connected to the anode of tube 404. The cathode 417 of diode 415 is connected through isolation resistor 419 to a slider 421 of a potentiometer 420. Potentiometer 420 is connected between B+ source 422 and ground 410. An output capacitor 423 is connected between cathode 417 of diode 415 and an output terminal connection 424.

Referring back again to Fig. 1 ramp generator 105 is connected with coincidence circuit 106. The coincidence which is detected is the coincidence in amplitude between a reference signal of fixed amplitude and a signal of varying amplitude. Because the signal of varying amplitude varies linearly with time, there is also a time coincidence detection. In Fig. 4, as previously described, the coincidence circuit corresponding to block 106 of Fig. 1 comprises the diodes 415 and 412, resistor 419, potentiometer 420, and output coupling capacitor 423. The output 424 of Fig. 4 of coincidence circuit 106 (Fig. 1) is coupled to an amplifier 108 of known type which is in turn coupled to an indicator 109. The indicator 109 may be any known device for indicating the presence of a signal such as a vacuum tube with a meter or relay in its output or a neon lamp.

The operation of the frequency calibrator meter of this invention may be readily understood from the above description of the elements of the invention and their operation with reference to the Figures 1 through 4 and particularly with reference to the waveforms on Figures 2 and 3. As has previously been indicated a standard of frequency ($f_1$) 101 and a source under test frequency ($f_2$) 102 are applied to a mixing device 103. The mixing device is a phase detector the resultant output of which is a low frequency wave indicative of the difference in frequency between $f_1$ and $f_2$ as may be seen by waveform 201. The wave variations are indicated upon a zero center vacuum tube 107 coupled to the output of phase detector 103. The output of phase detector 103 is applied to the squaring circuit 104 which clips the signal 201 resulting in the square wave signal 202 with equal widths and amplitudes of the positive and negative half waves. The square wave 202 is applied to ramp generator 105.

Referring now to Fig. 4 detailed operation of the ramp generator 105 is as follows: The tube 404 is what may be termed a ramp initiating switch tube. The anode 411 of tube 404 would normally be a few volts negative with respect to ground but diode 412 maintains this value at ground potential by conducting whenever the voltage of anode 411 tends to be negative with respect to ground. Capacitor 414 and resistor 418 comprise a ramp charging circuit. Resistor 406 sets the cathode bias for tube 404 and resistor 425 is the ground return for tube 404. Capacitor 409 is the cathode by-pass for resistor 406 and 407 connected in the cathode circuit of 405 of tube 404. Diode 415 is the coincidence diode. Resistor 419 is the load resistor for a coincidence signal which would be developed in diode 415. The adjustment of potentiometer 420 by its arm 421 varies the bias or reference level at which coincidence diode 415 may conduct. Thus it may be seen that a ramp signal (a signal increasing linearly with time) is generated, but that although of the same slope and of sawtooth form the ramp signal is of variable amplitude.

Referring to Fig. 2 at the point indicated 204 of waveform 201 a dotted line indicating a reference level is shown. This would be the point at which the squaring circuit, block 104, of Fig. 1 operates to generate waveform 202. During the most negative portion of wave 202 (interval "b") the charging circuit capacitor 414 is charged through resistor 418 from power source 422. The charging wave is shown at 205 in Fig. 2 and is seen to be equal in duration to the negative portion of the square wave 202. A reference level 206, preset by the adjustment of arm 421 of potentiometer 420 is set to establish a point beyond which diode 415 will become conductive when the ramp voltage 205 reaches the preset level 206. Because of the linear variation of the ramp voltage 205 with time the conductive state therefore indicates coincidence in time as well as amplitude. When diode 415 conducts a pulse 207 shown in Fig. 2 is presented. The pulse 207 is developed at the cathode 417 of diode 415 and is applied to amplifier 108 (Fig. 1) through capacitor 423. The amplified signal is applied to indicator 109 from amplifier 108, resulting in some form of indication as the flashing of a neon lamp or the operation of some other utilization device.

Referring now to Fig. 3 the operation of the system of this invention for frequency calibration may be explained:

The sawtooth waveform comprising lines 301 and 302, referred to in the diagram of Fig. 3 as signal "A," represents the signal which would be developed from waveform 201 of Fig. 2, if the frequency of this wave 201 is less than the preset desired frequency as represented by the positioning of control arm 421 on potentiometer 420 to set the bias on diode 415. A sawtooth signal represented by ramp line 301 and dotted line 303 and termed signal "C" would represent a signal frequency for wave 201 which is exactly the desired frequency.

Any frequency of wave 201 less than the desired frequency will generate a sawtooth wave represented by ramp line 301 and line 304 in Fig. 3 and designated signal "B."

As an illustration of the use of the invention assume that a voltage setting for control 420 is established to represent eight cycles per second as the upper limit of the permissible difference in frequency between frequency $f_1$ and $f_2$. (Since $f_1$ is the standard then it is the variation of frequency $f_2$ that will be measured.) So long as the difference is eight cycles or less than eight cycles a wave such as "Signal B" of Fig. 3 is produced and coincidence diode 415 will become conductive and a signal 305 (and designated B') will be applied to amplifier 108 and indicated on indicator 109. A frequency $f_2$ which is more than eight cycles different from $f_1$ will result in a sawtooth signal corresponding to signal "A" of Fig. 3 and accordingly not reach an amplitude equal to the reference level. Therefore diode 415 will not conduct and no signal will be applied to amplifier 108 and so no indication is observed on indicator 109.

In operation it has been found that a signal such as signal "C" representing the desired beat difference of $f_2$ with respect to $f_1$ may be determined to an accuracy of .01 cycle per second at eight cycles per second.

What is claimed as new is:

1. A frequency calibration system comprising: a source of test frequency signals to be calibrated; a source of standard frequency waves having a frequency near that of the signals to be calibrated; a phase detector coupled to both said sources for developing a difference signal representing the difference between the frequency of said signals and that of said waves; a wave squaring circuit coupled to said phase detector for developing square waves having equal positive and negative portions; a signal generator coupled to said wave squaring circuit and responsive to the negative portions of said square waves for generating a wave of linearly increasing amplitude in response to each negative square wave; a pulse generating coincidence circuit coupled to said generator and having adjustable means for establishing a predetermined point with respect to said wave of linearly increasing amplitude corresponding to a predetermined frequency of said square waves, said coincidence circuit generating a pulse when the wave of linearly increasing amplitude has an amplitude beyond said predetermined point; and indicating means coupled to said coincidence circuit and responsive to said pulses, whereby signals generated by said phase detector which are lower in frequency than that established by said adjustable means result in an indication, and signals higher in frequency than that established by said adjustable means result in a different indication.

2. A frequency calibration system comprising: a source of test frequency signals to be calibrated; a source of standard frequency waves; a phase detector coupled to both said sources; a wave squaring circuit coupled to said phase detector; a variable height ramp signal generator coupled to said wave squaring circuit; a pulse generating height coincidence circuit coupled to said ramp signal generator; and indicating means coupled to said coincidence circuit.

3. A frequency calibration system comprising: a test frequency signal source to be calibrated; a standard frequency wave source having a frequency near that of the signal calibrated; a phase detector coupled to said source for developing a difference signal; a wave squaring circuit coupled to said phase detector and responsive to said difference signal for developing square waves having positive and negative portions of equal amplitude and width, respectively; a variable height ramp signal generator coupled to said squaring circuit and responsive to the negative portions of said square waves for generating a wave of sawtooth form but variable duration and height in response to each of said negative square wave portions; a pulse generating voltage coincidence circuit coupled to said ramp signal generator; adjustable bias means coupled to said coincidence circuit for biasing said coincidence circuit to prevent the generation of a pulse until a selected bias is equaled in amplitude by said wave of sawtooth form, said bias being indicative of a predetermined frequency of said difference signal; and indicating means coupled to said coincidence circuit for indicating said pulses generated thereby; whereby a difference signal generated by said phase detector lower in frequency than that which corresponds to said bias setting results in an indication and a difference signal generated by said phase detector higher in frequency than that which corresponds to said bias setting result in no indication.

4. A frequency calibration system comprising: a source of a test frequency signal to be calibrated; a frequency standard generator wave having approximately the same frequency as that of the signal to be calibrated; a phase detector coupled to said source and said generator for developing a difference signal representing the difference in frequency between said source and said generator, a square-wave generating circuit coupled to said phase detector and responsive to said difference signal for developing square waves of equal positive and negative portions representative of said difference frequency; a variable height ramp signal generator coupled to said square wave generating circuit and responsive to the negative portions of said square waves for generating a wave of linearly increasing height in response to the duration of each negative portion of said square wave; a pulse generating voltage coincidence circuit coupled to said ramp generator; an adjustable bias voltage device coupled to said coincidence circuit for rendering said coincidence circuit inoperative until said wave of linearly increasing height reaches a predetermined amplitude corresponding to a predetermined value of said difference frequency, said coincidence circuit generating no pulses as long as said wave is below said amplitude and said coincidence circuit generating a pulse when said wave exceeds said amplitude; and indicating means coupled to said coincidence circuit for indicating said pulses.

5. A frequency calibrating system comprising: first means for detecting the difference in frequency between a desired signal and a standard frequency wave; second means coupled to said first means and responsive thereto for generating square waves; third means coupled to said second means and responsive thereto for generating waves of linearly increasing height and duration dependent upon said square waves; fourth means coupled to said third means and responsive to predetermined amplitudes of said waves of linearly increasing height for generating pulses coincident with said predetermined wave portions; and fifth means coupled to said fourth means for indicating said pulses.

References Cited in the file of this patent
UNITED STATES PATENTS

| | | |
|---|---|---|
| 2,419,527 | Bartelink | Apr. 29, 1947 |
| 2,685,648 | Budelman | Aug. 3, 1954 |